(12) United States Patent
Yamaguchi et al.

(10) Patent No.: US 11,826,821 B2
(45) Date of Patent: Nov. 28, 2023

(54) JOINED METAL MEMBER AND MANUFACTURING METHOD THEREFOR

(71) Applicants: THE JAPAN STEEL WORKS, LTD., Tokyo (JP); Daicel Miraizu Ltd., Tokyo (JP)

(72) Inventors: Takeshi Yamaguchi, Tokyo (JP); Chikara Kawabe, Tokyo (JP); Takayuki Uno, Tokyo (JP); Kiyoshi Shimizu, Tokyo (JP)

(73) Assignees: THE JAPAN STEEL WORKS, LTD., Tokyo (JP); DAICEL MIRAIZU LTD., Tokyo (JP)

( * ) Notice: Subject to any disclaimer, the term of this patent is extended or adjusted under 35 U.S.C. 154(b) by 0 days.

(21) Appl. No.: 17/721,316

(22) Filed: Apr. 14, 2022

(65) Prior Publication Data

US 2022/0347743 A1     Nov. 3, 2022

(30) Foreign Application Priority Data

Apr. 30, 2021   (JP) .................. 2021-077024

(51) Int. Cl.
*B22D 19/00*    (2006.01)
*B22D 17/00*    (2006.01)
(Continued)

(52) U.S. Cl.
CPC .......... *B22D 19/00* (2013.01); *B22D 17/00* (2013.01); *B23K 26/352* (2015.10);
(Continued)

(58) Field of Classification Search
None
See application file for complete search history.

(56) References Cited

U.S. PATENT DOCUMENTS

2016/0151993 A1*  6/2016  Ikeda ................ B29C 45/14311
                                                            428/141

FOREIGN PATENT DOCUMENTS

JP        2015-213960 A     12/2015

OTHER PUBLICATIONS

Xometry, "Metal Injection Molding vs. Die Casting: Differences and Comparison", Sep. 12, 2022, <https://www.xometry.com/resources/injection-molding/metal-injection-molding-vs-die-casting/>. (Year: 2022).*

(Continued)

*Primary Examiner* — Xiaobei Wang
(74) *Attorney, Agent, or Firm* — Potomac Law Group, PLLC

(57) ABSTRACT

According to an embodiment, a method for manufacturing a joined metal member includes: disposing a first metal member inside a mold of an injection molding apparatus, the first metal member being made of a first metal material, unevenness being formed over a surface of the first metal member, and an oxide film being formed so as to cover the unevenness; and injecting a second metal material into the mold, and thereby molding a second metal member and joining the second metal member to the first metal member, the second metal material being, when it is injected into the mold, in a semi-molten state, or in a molten state in which a difference between a temperature of the second metal material and a liquidus temperature thereof is smaller than or equal to 30° C.

12 Claims, 8 Drawing Sheets

(51) Int. Cl.
*B23K 26/352* (2014.01)
*B23K 103/10* (2006.01)
*B23K 103/08* (2006.01)
*B23K 103/02* (2006.01)

(52) U.S. Cl.
CPC ...... *B23K 2103/02* (2018.08); *B23K 2103/10* (2018.08); *B23K 2103/15* (2018.08); *Y10T 428/12611* (2015.01); *Y10T 428/12778* (2015.01)

(56) References Cited

OTHER PUBLICATIONS

Soult, Allison, "Spontaneous Reactions and Free Energy", Chemistry for Allied Health, Aug. 13, 2020, Chapter 11.5, pp. 1-3. (Year: 2020).*

Wikipedia, "Standard Gibbs free energy of formation", accessed Apr. 4, 2023, <https://en.wikipedia.org/wiki/Standard_Gibbs_free_energy_of_formation>.*

Wang et al., "Microstructural characteristics of near-liquidus cast AZ91D alloy during semi-solid die casting", 2010, Transactions of Nonferrous Metals Society of China, 20, pp. 171-177. (Year: 2010).*

Mao et al., "Effect of Pouring Temperatures on the Microstructures of the Semi-Solid AlSi7Mg Alloy", Feb. 2001, Journal of University of Science and Technology Beijing, vol. 23 No 1, pp. 38-41. (Year: 2001).*

* cited by examiner

JOINED METAL MEMBER AND MANUFACTURING METHOD THEREFOR

INCORPORATION BY REFERENCE

This application is based upon and claims the benefit of priority from Japanese patent application No. 2021-077024, filed on Apr. 30, 2021, the disclosure of which is incorporated herein in its entirety by reference.

BACKGROUND

The present disclosure relates to a joined metal member and its manufacturing method.

Japanese Unexamined Patent Application Publication No. 2015-213960 discloses a joined metal member in which a first metal member made of a first metal material and a second metal member made of a second metal material having a melting point lower than that of the first metal material are joined together.

SUMMARY

The inventors have found various problems in the development of a joined metal member in which a first metal member made of a first metal material and a second metal member made of a second metal material having a melting point lower than or equal to that of the first metal material are joined together.

Other problems to be solved and novel features will become apparent from descriptions in this specification and accompanying drawings.

According to an embodiment, a method for manufacturing a joined metal member includes: disposing a first metal member inside a mold of an injection molding apparatus, the first metal member being made of a first metal material, unevenness being formed over a surface of the first metal member, and an oxide film being formed so as to cover the unevenness; and injecting a second metal material into the mold, and thereby molding a second metal member and joining the second metal member to the first metal member, the second metal material being, when it is injected into the mold, in a semi-molten state, or in a molten state in which a difference between a temperature of the second metal material and a liquidus temperature thereof is smaller than or equal to 30° C.

According to another embodiment, in a joined metal member, unevenness is formed over a surface of a first metal member made of a first metal material, and an oxide film covering the unevenness is formed thereover, a second metal member is joined to the first metal member, the second metal member being injection-molded from a second metal material, the second metal material being, when it is injected, in a semi-molten state, or in a molten state in which a difference between a temperature of the second metal material and a liquidus temperature thereof is smaller than or equal to 30° C., and a joining strength between the first and second metal members is 30 MPa or larger.

According the above-described embodiments, it is possible to provide an excellent joined metal member.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments will be described hereinafter in detail with reference to the drawings. However, the present disclosure is not limited to the below-shown embodiments. Further, the following descriptions and the drawings are simplified as appropriate for clarifying the explanation.

Preliminary Study

The inventors have studied a method for manufacturing a joined metal member in which an aluminum alloy member and a magnesium alloy member are joined together. Specifically, the inventors have studied a method for die-casting a magnesium alloy in which an aluminum alloy member whose surface is roughened by irradiating it with a laser beam is disposed inside a mold of a die-casting apparatus as an insert member. Through the die casting, the magnesium alloy member is molded and joined to the insert member made of the aluminum alloy disposed inside the mold.

However, a sufficient joining strength could not be obtained in the joined metal member, in which the magnesium alloy member was joined to the insert member made of the aluminum alloy, by using the die-casting. The below-described mechanism could be the cause of the lack of the joining strength.

In the die casting, since the temperature of the molten magnesium alloy, which is injected into the mold, is high, the oxide film formed over the joining surface of the insert member by a surface roughening treatment could be broken. In that case, the molten magnesium alloy comes into contact with the bulk of the insert member, so that Al—Mg based intermetallic compounds are formed at the joining interface. When intermetallic compounds are formed at the joining interface, a sufficient joining strength cannot be obtained because the intermetallic compounds are brittle. Note that it is presumed that Al—Mg based intermetallic compounds $Al_3Mg_2$ and $Al_{12}Mg_{17}$ are likely to be formed because they both have a low melting point of about 450° C. according to the Al—Mg binary phase diagram.

First Embodiment

Configuration of Injection Molding Apparatus

Firstly, a configuration of an injection molding apparatus used in a method for manufacturing a joined metal member according to the first embodiment will be described with reference to FIGS. 1 to 3. Each of FIGS. 1 to 3 is a schematic cross-sectional diagram showing the configuration of the injection molding apparatus used in the method for manufacturing a joined metal member according to the first embodiment.

Figure 1:
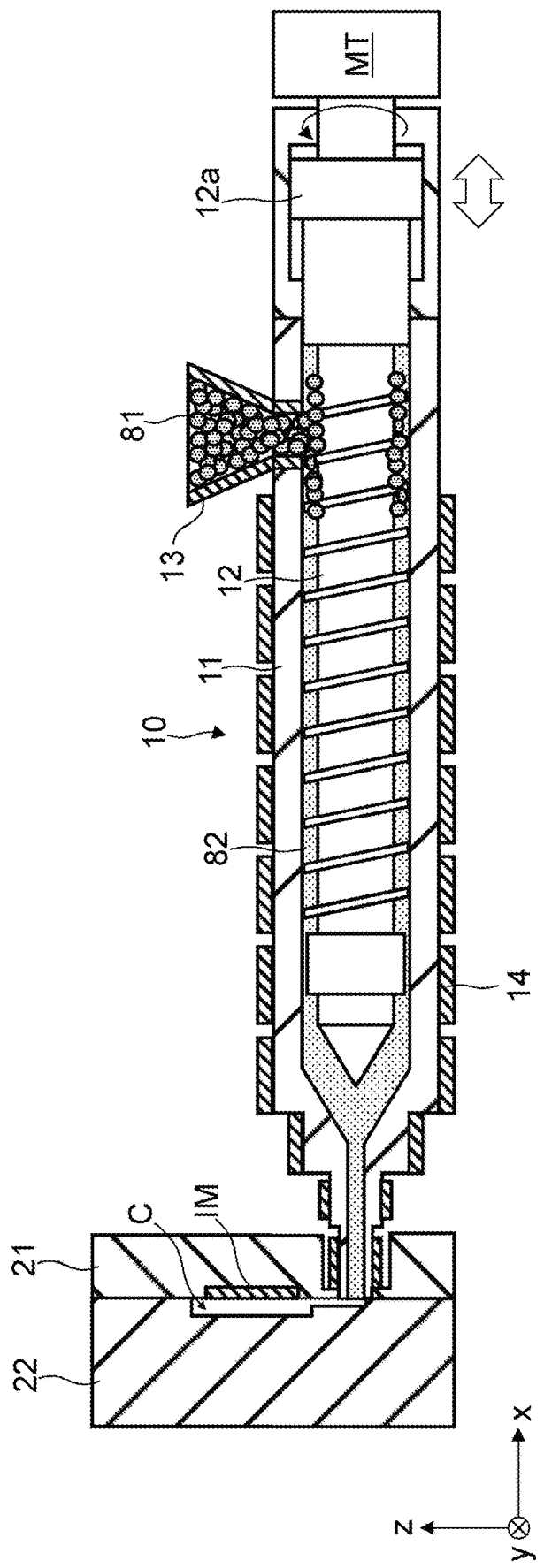
FIG. 1 is a schematic cross-sectional diagram showing a configuration of an injection molding apparatus used in a method for manufacturing a joined metal member according to a first embodiment.
Figure 2:
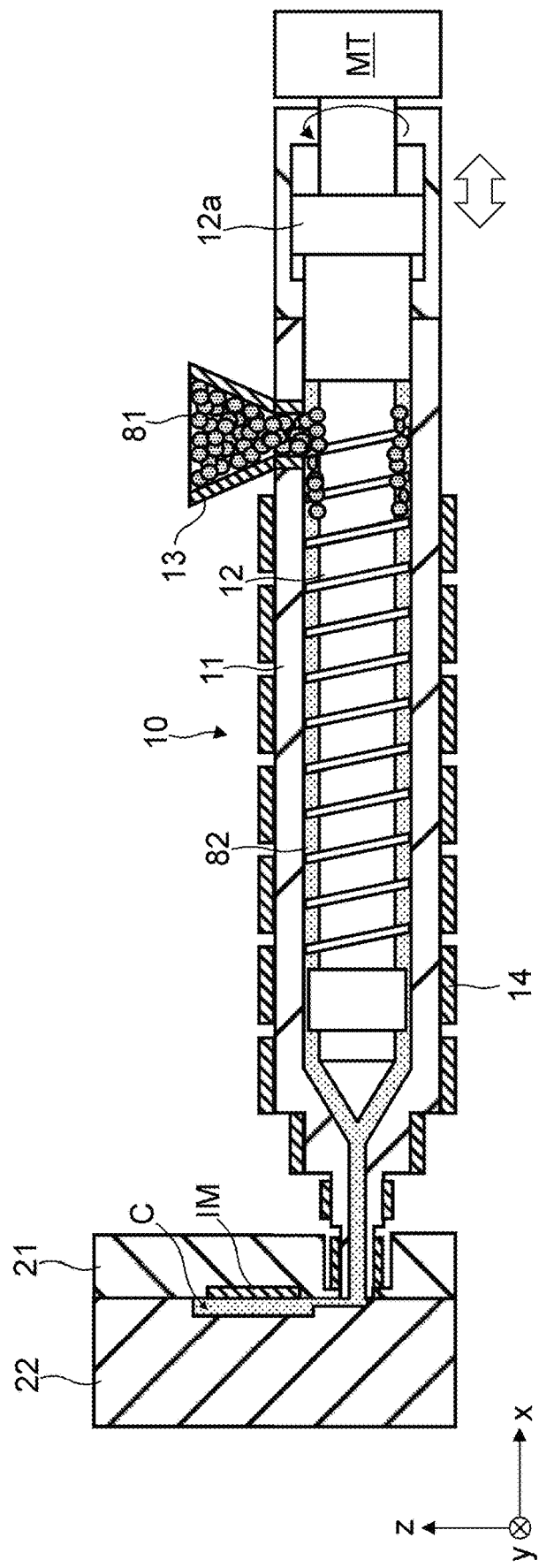
FIG. 2 is a schematic cross-sectional diagram showing a configuration of the injection molding apparatus used in the method for manufacturing a joined metal member according to the first embodiment.
Figure 3:
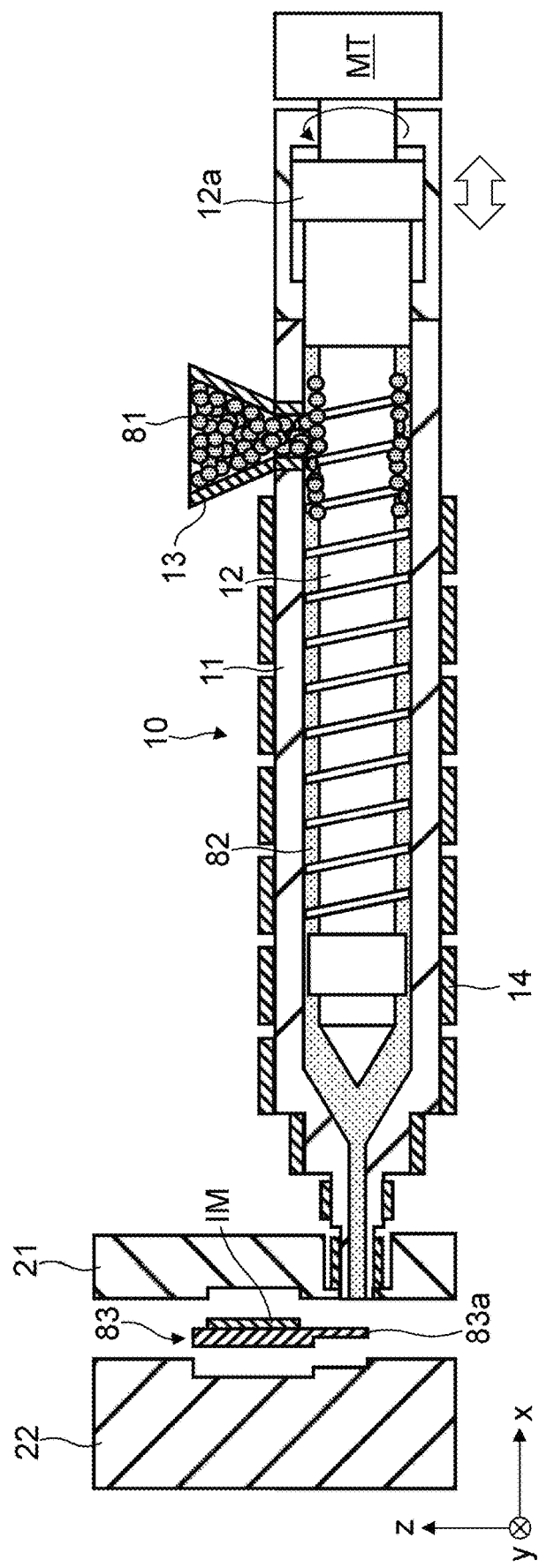
FIG. 3 is a schematic cross-sectional diagram showing a configuration of the injection molding apparatus used in the method for manufacturing a joined metal member according to the first embodiment.

Note that, needless to say, right-handed xyz-orthogonal coordinate systems shown in FIGS. 1 to 3 are shown for the sake of convenience for explaining positional relations among components. As a general rule, the z-axis positive direction is the vertically upward direction and the xy-plane is the horizontal plane throughout the drawings.

As shown in FIGS. 1 to 3, the injection molding apparatus according to this embodiment includes an injection machine 10, a fixed mold 21, and a movable mold 22. Note that the injection machine 10 includes a cylinder 11, a screw 12, a hopper 13, and ring-shaped heaters 14. This injection molding apparatus is a thixotropic-molding injection molding machine that injects a metal material in a semi-molten state (hereinafter also referred to as a "semi-molten metal"). The metal material to be injected is, for example, but not limited to, a metal material containing magnesium as its main component.

FIG. 1 shows a state of the injection molding apparatus immediately before it injects a semi-molten metal 82 into a cavity C of the mold (the fixed and movable molds 21 and 22).

FIG. 2 shows a state of the injection molding apparatus when the injection of the semi-molten metal 82 into the cavity C of the mold has been completed.

FIG. 3 shows a state of the injection molding apparatus when the joined metal member 83 has been removed from the mold.

As shown in FIGS. 1 to 3, the cylinder 11 is a cylindrical member extending in the x-axis direction. The front end part (the end part on the x-axis negative side) of the cylinder 11 is narrowed in a stepwise manner. That is, the front end part of the cylinder 11 is formed in a nozzle shape. In the example shown in the drawings, the front end part of the cylinder 11 is narrowed in three steps, and the tip (i.e., the forefront end part) of the cylinder 11 is inserted into a through hole formed in the fixed mold 21.

The screw 12 extends in the x-axis direction and is rotatably housed in the cylinder 11. The base part (the end on the x-axis positive side) of the screw 12 is connected to a motor MT, which serves as a rotational drive source, through a piston 12a. The piston 12a can be moved in the x-axis direction by an actuator (not shown), so that the screw 12 can also be moved in the x-axis direction. As shown in FIG. 2, as the screw 12 moves forward in the x-axis negative direction, the semi-molten metal 82 is injected into the mold (the fixed and movable molds 21 and 22).

The hopper 13 is a cylindrical member for charging (i.e., feeding) metal chips 81, which are the raw material for the semi-molten metal 82 shown in FIG. 3, into the cylinder 11. The hopper 13 is disposed above the end part of the cylinder 11 on the x-axis positive side.

The ring-shaped heaters 14 are arranged side by side along the longitudinal direction of the cylinder 11 (in the x-axis direction) so as to cover the outer peripheral surface of the cylinder 11. In the example shown in FIGS. 1 to 3, ten ring-shaped heaters 14 are provided on the front end side (the x-axis negative side) of the cylinder 11 with respect to the hopper 13. Each of the plurality of ring-shaped heaters 14 is individually controlled, for example, by a control unit (not shown).

In the injection machine 10 according to the first embodiment, the metal chips 81 supplied from the hopper 13 are stirred by the rotating screw 12 while being heated by the ring-shaped heaters 14 inside the cylinder 11. The metal chips 81 are heated, and are compressed as they are pressed from the base part of the screw 12 toward the front end part thereof (in the x-axis negative direction), so that they are transformed into the semi-molten metal 82.

The fixed mold 21 is a mold fixed to the front end of the injection machine 10. Meanwhile, the movable mold 22 is a mold that is driven by a drive source (not shown) and can slide in the x-axis direction. When the movable mold 22 moves in the x-axis positive direction and abuts against (i.e., comes into contact with) the fixed mold 21, a cavity C whose shape conforms to the shape of the joined metal member 83 to be manufactured (see FIG. 3) is formed between the fixed and movable molds 21 and 22 as shown in FIG. 1.

Method for Manufacturing Joined Metal Member

Next, a method for manufacturing a joined metal member according to the first embodiment will be described with reference to FIGS. 1 to 3.

Firstly, as shown in FIG. 1, an insert member (a first metal member) IM is disposed inside the mold (the fixed and movable molds 21 and 22) of the injection molding apparatus. Although the insert member IM is disposed in (or attached to) the fixed mold 21 in the example shown in FIG. 1, it may instead be disposed in (or attached to) the movable mold 22.

Note that an oxide film of the metal material (the first metal material) of which the insert member IM is made is formed over the surface of the insert member IM that serves as the joining surface. It is presumed that the contact between the semi-molten metal 82 and the bulk of the insert member IM is suppressed (or prevented) by this oxide film, and hence the formation of intermetallic compounds at the joining interface can be suppressed (or prevented), so that the joining strength is improved.

For example, it is possible to form an oxide film while roughening the surface of the insert member IM by applying a laser beam thereto in a manner similar to the technique disclosed in Japanese Unexamined Patent Application Publication No. 2015-213960. That is, it is possible to form unevenness in the surface of the insert member IM and form an oxide film over the surface of the unevenness at the same time. By forming unevenness in the joining surface, the semi-molten metal 82 enters the unevenness (i.e., recessed parts of the unevenness). As a result, the joining strength is improved owing to the anchor effect. The height difference of the unevenness (i.e., the difference between vertical positions of tops and bottoms in the unevenness) is, for example, 10 to 1000 μm. The height difference of the unevenness is measured, for example, from a micrograph of the joining interface.

The thickness of the oxide film formed over the surface of the insert member IM is, for example, about 0.01 to 10 μm. The thickness of the oxide film is measured, for example, by an analysis in the depth direction using glow discharge optical emission spectrometry (GD-OES: Glow Discharge Optical Emission Spectrometry) as will be described later in examples.

When the thickness of the oxide film is smaller than 0.01 μm, the formation of the oxide film could be incomplete, or the oxide film could be peeled off due to the semi-molten metal 82 flowing to the oxide film. As a result, the semi-molten metal 82 could come into contact with the bulk of the insert member IM and hence intermetallic compounds could be formed at the joining interface, so that the joining strength could deteriorate.

On the other hand, when the thickness of the oxide film exceeds 10 μm, cracks could occur in the oxide film and hence the oxide film could be peeled off. As a result, the semi-molten metal 82 could come into contact with the bulk of the insert member IM and hence an intermetallic compound(s) could be formed at the joining interface, so that the joining strength could deteriorate. Further, the unevenness in the surface of the insert member IM could become insufficient, so that the anchor effect could not be obtained.

Publicly-known laser can be used. Examples of the usable laser include $YVO_4$ laser, fiber laser, excimer laser, carbon dioxide laser, ultraviolet laser, YAG laser, semiconductor laser, glass laser, ruby laser, He—Ne laser, nitrogen laser, chelate laser, and dye laser. As the oscillating method, pulse oscillation or continuous oscillation can be used. Among them, the fiber laser is preferred because it can increase the energy density, and continuous oscillation-type single-mode fiber laser is particularly preferred.

Note that the formation of unevenness as well as the formation of an oxide film over the surface thereof may be performed through, instead of applying a laser beam, a chemical treatment such as etching by an etchant, or a physical treatment such as machining, sandblasting, and grinding. Further, the formation of unevenness and the formation of an oxide film may be performed separately from each other.

Further, the melting point of the metal material to be injected (the second metal material) is lower than or equal to the melting point of the metal material of which the insert member IM is made. In the case where the metal material to be injected is a metal material containing magnesium as its main component, the metal material of which the insert member IM is made is, for example, but not limited to, a metal material containing iron or aluminum as its main component.

Note that the metal material to be injected and the metal material of which the insert member IM is made may be the same metal material as each other.

Next, as shown in FIG. 2, the screw 12 is moved forward in the x-axis negative direction, so that the semi-molten metal 82 is charged (i.e., injected) into the mold (the fixed and movable molds 21 and 22), i.e., into the cavity C. As the semi-molten metal 82 is solidified in the cavity C, a molded member (a second metal member) 83a is molded and the molded member 83a is joined to the insert member IM at the same time. Note that since the melting point (the liquidus temperature) of the metal material to be injected is lower than or equal to the melting point (the liquidus temperature) of the metal material of which the insert member IM is made, the insert member IM disposed inside the mold (the fixed and movable molds 21 and 22) does not melt.

As a result, as shown in FIG. 3, a joined metal member 83 in which the insert member IM and the molded member 83a are joined together is manufactured.

Lastly, as shown in FIG. 3, the screw 12 is moved backward in the x-axis positive direction, and the movable mold 22 is moved in the x-axis negative direction and thereby is released (detached) from the fixed mold 21, so that the manufactured joined metal member 83 is removed therefrom.

As described above, in the method for manufacturing a joined metal member according to this embodiment, the semi-molten metal 82 is injected into the mold in which the insert member IM is disposed, so that a molded member 83a is molded and the molded member 83a is joined to the insert member IM at the same time. Note that unevenness and an oxide film covering the unevenness are formed in advance over the joining surface of the insert member IM to which the molded member 83a is to be joined.

In the method for manufacturing a joined metal member according to this embodiment, the semi-molten metal 82 is injected into the mold, so that the molded member 83a is molded and the molded member 83a is joined to the insert member IM at the same time. In the method for manufacturing a joined metal member according to this embodiment, a joining strength superior to that in the case where die casting is used is obtained. The conceivable reason for this feature is, for example, as follows.

By joining the insert member IM and the molded member 83a at a temperature lower than that in the die casting, it is possible to prevent the oxide film formed over the surface (the joining surface) of the insert member IM from being broken or peeled off due to the solidification or contraction. As a result, the contact between the semi-molten metal 82 and the bulk of the insert member IM can be suppressed, and hence the formation of intermetallic compounds at the joining interface can be suppressed, so that the joining strength is improved.

The joining strength is, for example, 30 MPa or larger, preferably 40 MPa or larger, and more preferably 50 MPa or larger.

Further, since the molding is performed at a temperature lower than that in the die casting, defects such as entrapment of gas and shrinkage cavity are less likely to occur. Further, in the method for manufacturing a joined metal member according to this embodiment, since the semi-molten metal 82 is injected into the mold at a pressure higher than that in the die casting, the semi-molten metal 82 is more likely to enter the unevenness (i.e., recessed parts of the unevenness) formed over the joining surface of the insert member IM. Further, a melting furnace, which is used in the die casting, is not necessary, and entrapment of sludge, which would occur in such a melting furnace, does not occur.

Note that similar effects can also be obtained even when, instead of using the semi-molten metal, a molten metal of which the difference of the temperature from the liquidus temperature thereof is smaller than or equal to 30° C. is used. The difference of the temperature from the liquidus temperature is preferably 20° C. or smaller. By injecting, instead of the semi-molten metal, a molten metal having a temperature higher than the liquidus temperature thereof into the mold, the fillability is improved when a thin-walled product is molded.

Further, in the die casting, a molten metal whose temperature differs from the liquidus temperature thereof by about 70 to 100° C. is used

EXAMPLES

The method for manufacturing a joined metal member according to the first embodiment will be described hereinafter in detail by using examples. However, the method for manufacturing a joined metal member according to the first embodiment is not limited to the below-shown examples.

In a Table 1, test conditions and test results of Examples 1 to 5 and Comparative Examples 1 to 3 are summarized. In the Table 1, "Molding Material" is a metal material of which a molded member is made. "Insert Material" is a metal material of which an insert member is made.

As shown in the Table 1, the molding material was an AZ91D magnesium alloy in all of the Examples 1 to 5 and the Comparative Examples 1 to 3. The insert material was an A5052 aluminum alloy in the Example 1 and the Comparative Example 1, was an AZ91D magnesium alloy in the Examples 2 to 4 and Comparative Example 2, and was an SPCC steel in the Example 5 and Comparative Example 3.

TABLE 1

| | Molding Material | Insert Material | Laser Treatment | Molding Temperature (° C.) | Joining Possible/ Impossible | Joining strength (MPa) |
|---|---|---|---|---|---|---|
| Example 1 | AZ91D magnesium alloy | A5052 aluminum alloy | Performed | 600 | Possible | 89 |
| Comparative Example 1 | | | Not Performed | | Impossible | — |
| Example 2 | | AZ91D magnesium alloy | Performed | 600 | Possible | 89 |
| Example 3 | | | | 580 | | 100 |
| Example 4 | | | | 620 | | 119 |
| Comparative Example 2 | | | Not Performed | 600 | Impossible | — |
| Example 5 | | SPCC steel | Performed | 600 | Possible | 115 |
| Comparative Example 3 | | | Not Performed | | Impossible | — |

Example 1

Figure 4:
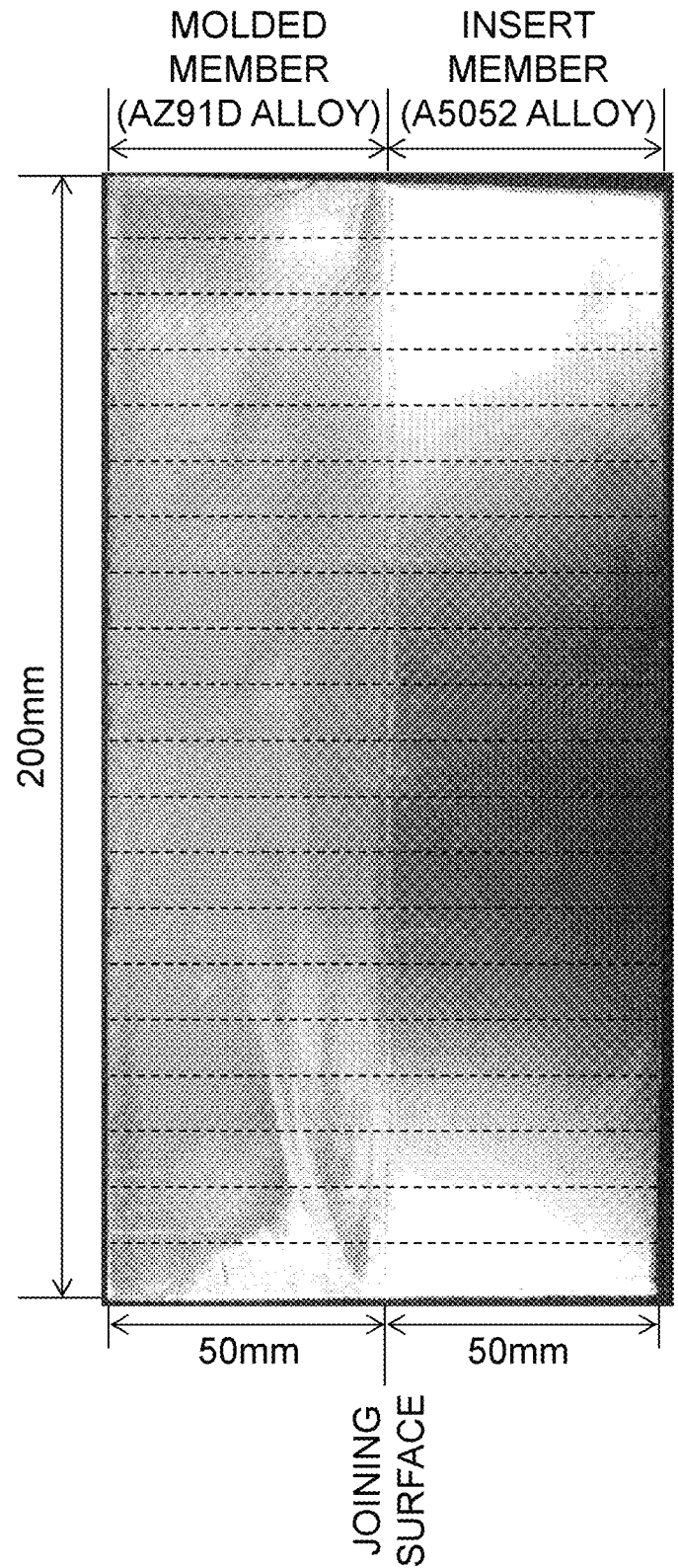
FIG. 4 is a macrograph of a joined metal member manufactured by the method for manufacturing a joined metal member according to an Example 1.

FIG. 4 is a macrograph of a joined metal member manufactured by the method for manufacturing a joined metal member according to the Example 1.

As shown in FIG. 4, the insert member was a plate member having a length of 200 mm, a width of 50 mm, and a thickness of 2 mm. The joining surface of the insert member to which the molded member was to be joined was a long side surface having a length of 200 mm and a thickness of 2 mm.

Prior to molding the molded member, a laser beam was applied to the joining surface of the insert member made of the A5052 aluminum alloy, so that the joining surface was roughened (i.e., unevenness was formed) and an oxide film was formed thereover. In the Table 1, "Laser treatment" means the above-described process. This laser treatment is called DLAMP (Registered Trademark).

As shown in FIG. 1, the insert member, which was subjected to the laser treatment, was disposed inside a mold. Then, as shown in FIGS. 2 and 3, the AZ91D magnesium alloy having a temperature of 600° C. was injected into the mold, so that a molded member was molded and the molded member was joined to the insert member at the same time.

Note that since the liquidus temperature of the AZ91D magnesium alloy is 595° C., the AZ91D magnesium alloy injected into the mold was in a molten state in which the difference of the temperature of the AZ91D magnesium alloy from the liquidus temperature thereof was 5° C.

As shown in FIG. 4, the molded member was also a plate member having a length of 200 mm, a width of 50 mm, and a thickness of 2 mm. The joining surface of the molded member to which the insert member was to be joined was a long side surface having a length of 200 mm and a thickness of 2 mm. That is, the long side surface of the molded member and that of the insert member were joined together.

The joined metal member shown in FIG. 4 was cut at intervals of 10 mm in the width direction, i.e., was cut along broken lines shown in the drawing, and as a result, 20 tensile test pieces in conformity with ISO195095, each of which had a length of 100 mm, a width of 10 mm, and a thickness of 2 mm, were manufactured. Tensile tests were carried out for these 20 tensile test pieces, and the average value of the obtained tensile strengths thereof was used as the joining strength. As shown in the Table 1, the joining strength of the joined metal member manufactured by the method for manufacturing a joined metal member according to the first embodiment was 89 MPa. This joining strength is much higher than the joining strength that is obtained by using an adhesive (which is about 10 MPa).

Figure 5:
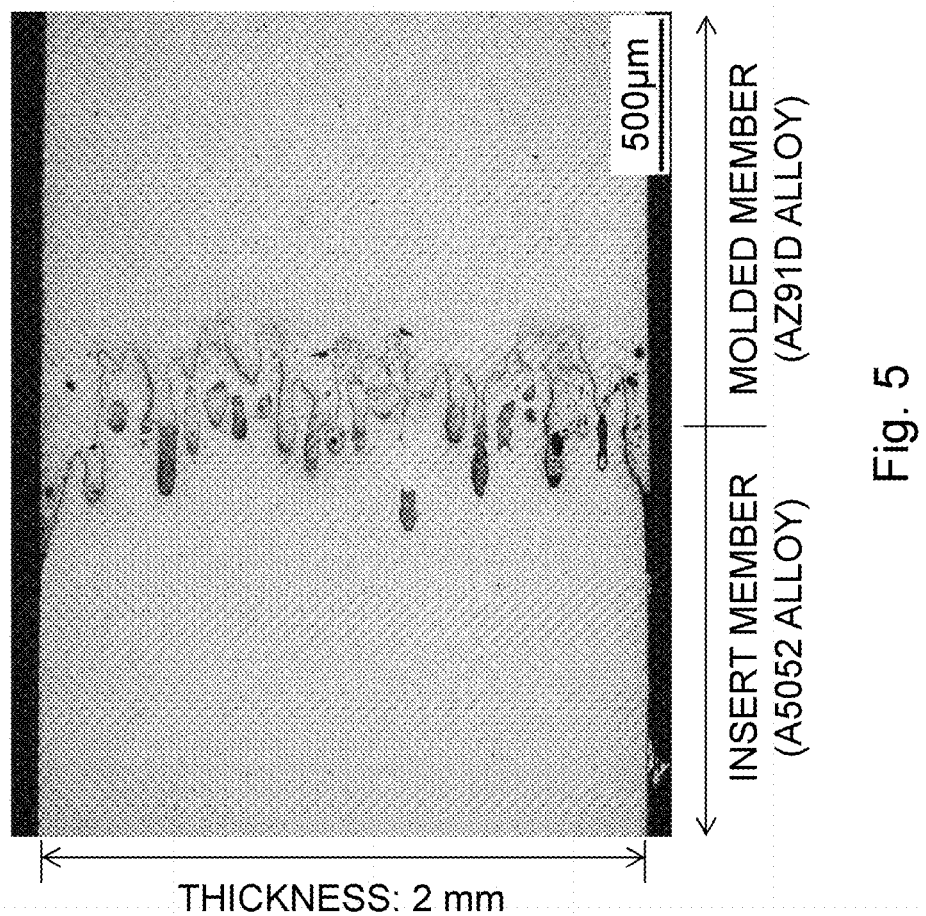
FIG. 5 is a cross-sectional micrograph of the joining interface of the joined metal member manufactured by the method for manufacturing a joined metal member according to the Example 1.

Here, FIG. 5 is a cross-sectional micrograph of the joining interface of the joined metal member manufactured by the method for manufacturing a joined metal member according to the Example 1.

As shown in FIG. 5, over the joining surface of the insert member made of the A5052 aluminum alloy, unevenness in the order of several tens to several hundreds of micrometers was formed and the molded member entered recessed parts of the unevenness. Therefore, it is presumed that, in the joined metal member according to the Example 1, a high joining strength was obtained by the anchor effect that was obtained owing to the unevenness formed over the joining surface.

Note that the liquidus temperature and solidus temperatures of the A5052 aluminum alloy are 649° C. and 607° C., respectively. Therefore, the unevenness formed over the joining surface of the insert member made of the A5052 aluminum alloy does not melt even when the AZ91D magnesium alloy having a temperature of 600° C. is injected into the mold.

Further, since the oxide film is formed over the joining surface, the contact between the AZ91D magnesium alloy in the semi-molten state and the A5052 aluminum alloy constituting the bulk of the insert member is suppressed, and hence the formation of intermetallic compounds at the joining interface can be suppressed.

Comparative Example 1

As shown in the Table 1, a joined metal member was manufactured under the same conditions as in the Example 1, except that the joining surface of the insert member was not subjected to the laser treatment.

The joined metal member manufactured by the method for manufacturing a joined metal member according to the Comparative Example 1 fractured during the manufacturing of tensile test pieces thereof. That is, as shown in the Table 1, in the method for manufacturing a joined metal member according to the Comparative Example 1, the insert member and the molded member could not be joined together, so that the joining strength thereof could not be measured.

In the joined metal member according to the Comparative Example 1, since the joining surface of the insert member was not subjected to the laser treatment, the anchor effect, which would otherwise be obtained owing to the unevenness formed over the joining surface, could not be obtained. Further, since no oxide film was formed over the joining surface, there is a possibility that the AZ91D magnesium alloy in the semi-molten state came into contact with the A5052 aluminum alloy constituting the bulk of the insert member, and hence intermetallic compounds having low melting points were formed at the joining interface.

Example 2

As shown in the Table 1, a joined metal member was manufactured under the same conditions as in the Example 1, except that the AZ91D magnesium alloy, which was used as the material for the molding material, was also used as the material for the insert material instead of using the A5052 aluminum alloy.

As shown in the Table 1, the joining strength of the joined metal member manufactured by the method for manufacturing the joined metal member according to the Example 2 was 89 MPa and hence was as good as that in the Example 1. It is presumed that, in the joined metal member according to the Example 2, the high joining strength was also obtained by the anchor effect owing to the unevenness formed over the joining surface.

The unevenness formed over the joining surface of the insert member made of the AZ91D magnesium alloy did not melt even when the AZ91D magnesium alloy, which was in the molten state and had a temperature of 600° C., i.e., a temperature 5° C. higher than the liquidus temperature thereof, was injected into the mold.

Example 3

As shown in the Table 1, a joined metal member was manufactured under the same conditions as in the Example 2, except that the temperature during the molding was lowered to 580° C. Note that since the liquidus temperature of the AZ91D magnesium alloy is 595° C., the AZ91D magnesium alloy injected into the mold was in a semi-molten state. Note that the solidus temperature of the AZ91D magnesium alloy is 470° C.

As shown in the Table 1, the joining strength of the joined metal member manufactured by the method for manufacturing the joined metal member according to the Example 3 was 100 MPa, which was higher than that of the joined metal member according to the Example 2, and hence was satisfactory. It is presumed that, in the joined metal member according to the Example 3, the high joining strength was also obtained by the anchor effect owing to the unevenness formed over the joining surface.

Example 4

As shown in the Table 1, a joined metal member was manufactured under the same conditions as in the Example 2, except that the temperature during the molding was raised to 620° C. Note that since the liquidus temperature of the AZ91D magnesium alloy is 595° C., the AZ91D magnesium alloy injected into the mold was in a molten state in which the difference of the temperature of the AZ91D magnesium alloy from the liquidus temperature thereof by 25° C.

As shown in the Table 1, the joining strength of the joined metal member manufactured by the method for manufacturing the joined metal member according to the Example 4 was 119 MPa, which was even higher than that of the joined metal member according to the Example 2, and hence was satisfactory. It is presumed that, in the joined metal member according to the Example 4, the high joining strength was also obtained by the anchor effect owing to the unevenness formed over the joining surface.

The unevenness formed over the joining surface of the insert member made of the AZ91D magnesium alloy did not melt even when the AZ91D magnesium alloy, which was in the molten state and had a temperature of 620° C., i.e., a temperature 25° C. higher than the liquidus temperature thereof, was injected into the mold.

In the joined metal members according to the Examples 2 to 4, the insert material and the molding material are the same metal material as each other. As described above, in the method for manufacturing a joined metal member according to this embodiment, a satisfactory joining strength can be obtained even when the insert material and the molding material are the same metal material as each other.

In the method for manufacturing a joined metal member according to this embodiment, the molding material injected into the mold is in a semi-molten state, or in a molten state at a temperature of which the difference from the liquidus temperature thereof is smaller than or equal to 30° C. Therefore, the unevenness formed over the joining surface of the insert member is less likely to melt when it comes into contact with the injected molding material. Further, the melting of the unevenness is suppressed by the oxide film formed over the surface of the unevenness. It is presumed that, as a result, the anchor effect of the unevenness formed over the joining surface is sufficiently exerted.

Comparative Example 2

As shown in the Table 1, a joined metal member was manufactured under the same conditions as in the Example 2, except that the joining surface of the insert member was not subjected to the laser treatment.

The joined metal member manufactured by the method for manufacturing a joined metal member according to the Comparative Example 2 fractured when it was removed from the mold. That is, as shown in the Table 1, in the method for manufacturing a joined metal member according to the Comparative Example 2, the insert member and the molded member could not be joined together, so that the joining strength thereof could not be measured.

In the joined metal member according to the Comparative Example 2, since the joining surface of the insert member was not subjected to the laser treatment, the anchor effect, which would otherwise be obtained owing to the unevenness formed over the joining surface, could not be obtained.

It should be noted that, in the joined metal member according to the Comparative Example 2, since the insert material and the molding material were both made of the AZ91D magnesium alloy, no intermetallic compound was formed at the joining interface.

Example 5

As shown in the Table 1, a joined metal member was manufactured under the same conditions as in the Example 1, except that an SPCC steel was used as the material for the insert material instead of using the A5052 aluminum alloy.

As shown in the Table 1, the joining strength of the joined metal member manufactured by the method for manufacturing the joined metal member according to the Example 5 was 115 MPa, which was higher than that of the joined metal member according to the Example 1, and hence was satisfactory. It is presumed that, in the joined metal member according to the Example 5, the high joining strength was also obtained by the anchor effect owing to the unevenness formed over the joining surface.

Note that the liquidus temperature and solidus temperature of the SPCC steel are high and are around 1,500° C. Therefore, the unevenness formed over the joining surface of the insert member made of the SPCC steel does not melt even when the AZ91D magnesium alloy having a temperature of 600° C. is injected into the mold.

Comparative Example 3

As shown in the Table 1, a joined metal member was manufactured under the same conditions as in the Example 5, except that the joining surface of the insert member was not subjected to the laser treatment.

The joined metal member manufactured by the method for manufacturing a joined metal member according to the Comparative Example 3 fractured when it was removed from the mold. That is, as shown in the Table 1, in the method for manufacturing a joined metal member according to the Comparative Example 3, the insert member and the molded member could not be joined together, so that the joining strength thereof could not be measured.

In the joined metal member according to the Comparative Example 3, since the joining surface of the insert member was not subjected to the laser treatment, the anchor effect, which would otherwise be obtained owing to the unevenness formed over the joining surface, could not be obtained. It should be noted that, in the joined metal member according to the Comparative Example 3, since the insert material was made of the SPCC steel and the molded member was made of the AZ91D magnesium alloy, no intermetallic compound was formed at the joining interface.

Examination on Joining Interface in Example 1

The joining interface of the joined metal member according to the Example 1 was observed by using an SEM (Scanning Electron Microscope), and an elementary analysis was performed thereon through EDX (Energy Dispersive X-ray spectroscopy).

Figure 6:
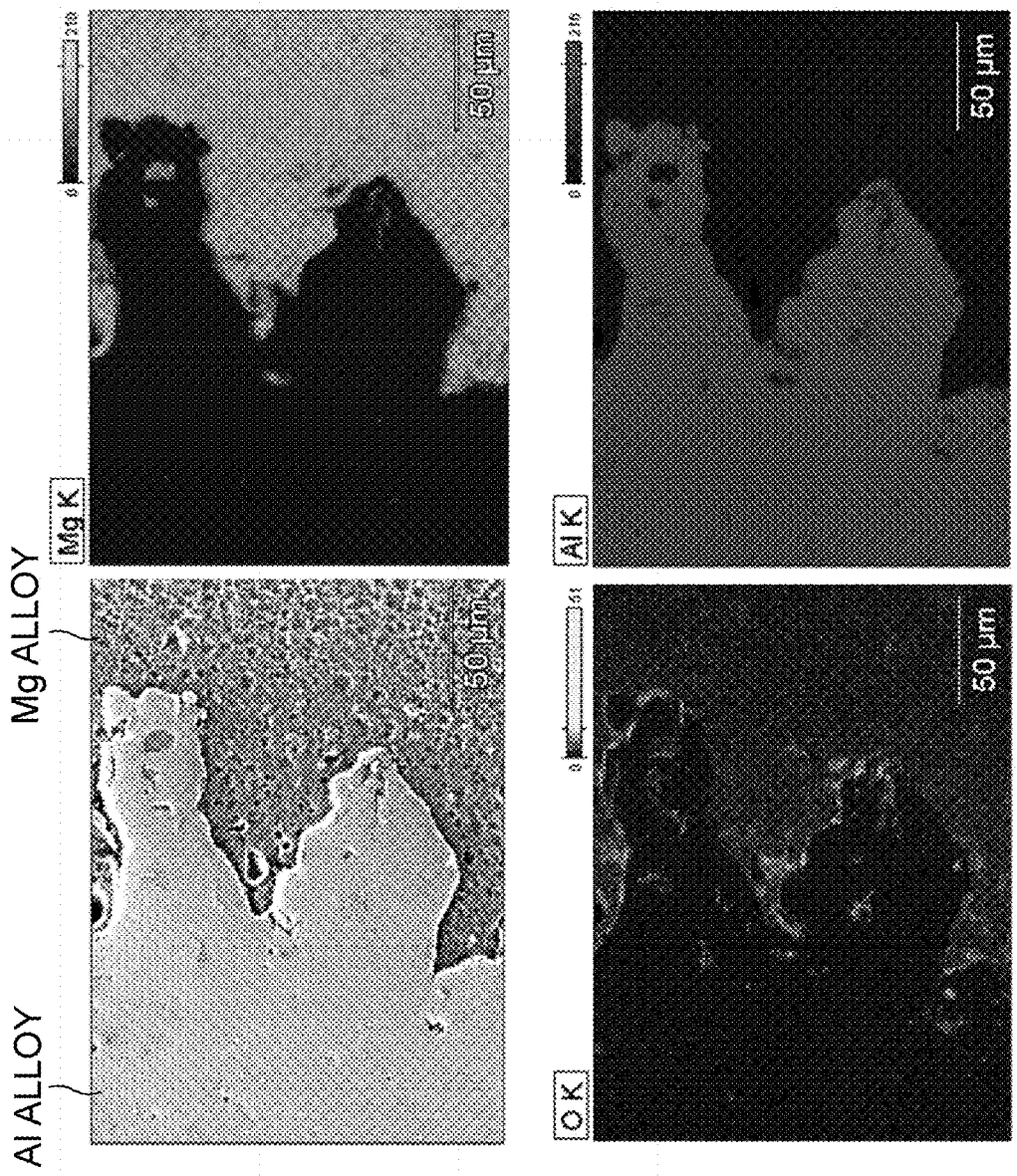
FIG. 6 shows a SEM observation photograph of the joining interface of the joined metal member according to the Example 1, and results of analyses of elementals thereof, i.e., Mg (magnesium), Al (aluminum), and O (oxygen), in the same area.
Figure 7:
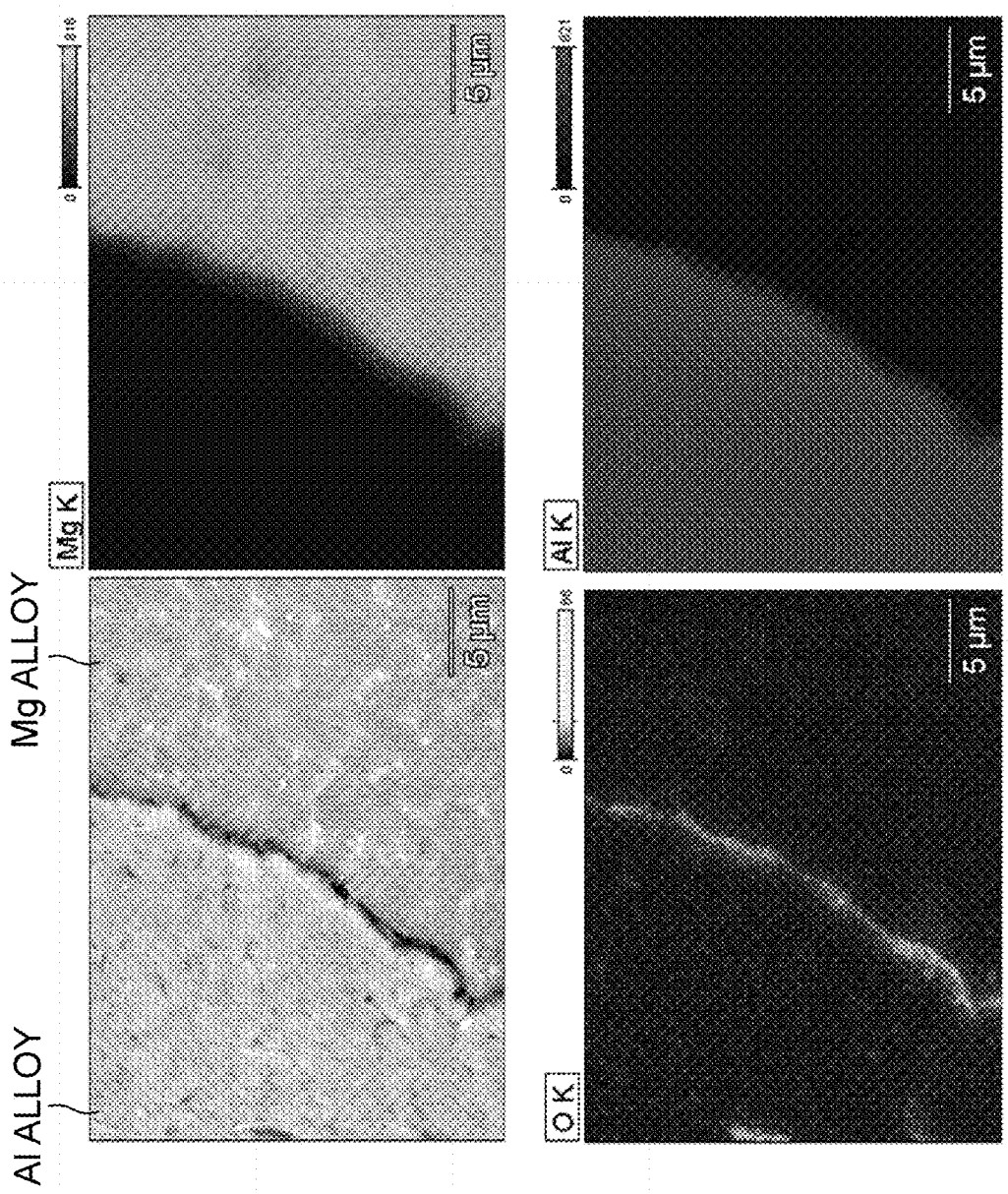
FIG. 7 shows a SEM observation photograph of the joining interface of the joined metal member according to the Example 1, and results of analyses of elementals thereof, i.e., Mg (magnesium), Al (aluminum), and O (oxygen), in the same area.

Note that each of FIGS. 6 and 7 shows a SEM observation photograph of the joining interface of the joined metal member according to the Example 1, and results of analyses of elementals thereof, i.e., magnesium (Mg), aluminum (Al), and oxygen (O), in the same area. The difference between FIGS. 6 and 7 is the magnification.

As shown in FIG. 6, the AZ91D magnesium alloy (hereinafter also referred to as the "Mg alloy") entered, without leaving space, recessed parts of the unevenness having a height difference in the order of several tens of micrometers, which was formed over the surface of the insert member made of the A5052 aluminum alloy (hereinafter also referred to as the "Al alloy").

Note that, as shown in FIG. 7 in which the joining interface is shown in an enlarged manner (i.e., shown with a higher magnification), the area where Al is present and the area where Mg is present do not overlap each other in the result of the elementary analysis of Al and Mg, and hence it is surmised that no intermetallic compound of Al and Mg was formed.

Further, since oxygen (O) is concentrated along the joining interface, it is surmised that an oxide film was formed along the joining interface. It is presumed that the contact between the Mg alloy and the Al alloy constituting the bulk of the insert member is suppressed by this oxide film, and hence the formation of intermetallic compounds at the joining interface can be suppressed.

Next, an analysis in the depth direction of the surface of the insert member according to the Example 1 was performed by using GD-OES (Glow Discharge Optical Emission Spectrometry). For the purpose of the comparison, an analysis in the depth direction of the surface of the insert member according to the Comparative Example 1 was also performed.

Figure 8:
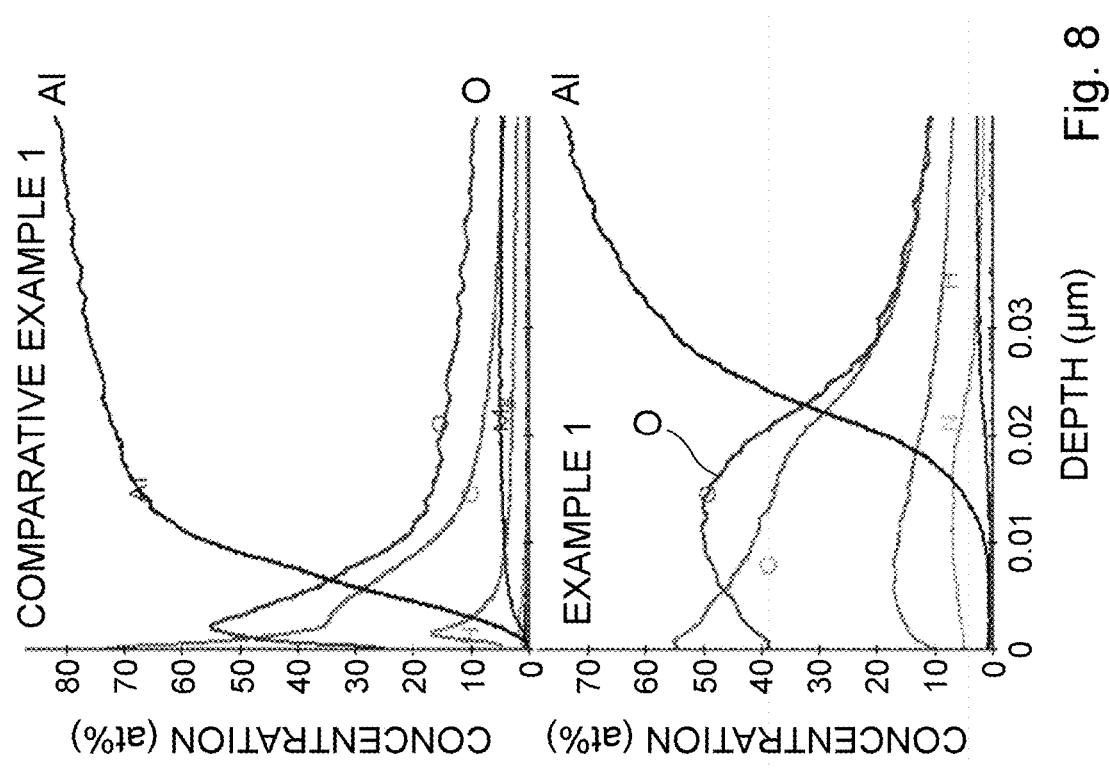
FIG. 8 shows graphs showing results of analyses in the depth direction of the surface of insert members (Al alloys) according to the Example 1 and a Comparative Example 1.

FIG. 8 shows graphs showing results of analyses in the depth direction of the surfaces of the insert members according to the Example 1 and the Comparative Example 1. The unevenness was formed by the laser treatment in the surface of the insert member according to the Example 1. In contrast, no unevenness was formed by the laser treatment in the surface of the insert member according to the Comparative Example 1.

As shown in FIG. 8, in the insert member according to the Comparative Example 1, which was made of the Al alloy, the concentration of Al was low and the concentration of oxygen (O) was high in a range from the surface to a depth of 0.01 µm. Therefore, it is presumed that the thickness of the aluminum oxide film, which was naturally formed over the surface of the insert member, was smaller than 0.01 µm.

In contrast, in the insert member according to the Example 1, which was made of the Al alloy, the concentration of Al was low and the concentration of oxygen (O) was high in a range from the surface to a depth of about 0.02 to 0.03 µm. Therefore, it is presumed that the thickness of the aluminum oxide film, which was formed over the surface of the insert member by the laser treatment, was about 0.02 to 0.03 µm.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a joined metal member in which a first metal member made of a first metal material and a second metal member made of a second metal material having a melting point lower than or equal to that of the first metal material are joined together by injection molding, comprising the steps of:

(a) disposing the first metal member inside a mold of an injection molding apparatus, unevenness being formed over a surface of the first metal member and an oxide film having a thickness of 0.01 to 10 µm being formed so as to cover the unevenness, and the surface of the first metal member serving as a joining surface to which the second metal member is joined; and (b) injecting the second metal material into the mold in which the first metal member is disposed, and thereby molding the second metal member and joining the second metal member to the first metal member, the second metal material being, when it is injected into the mold, in a semi-molten state, or in a molten state having a temperature that is higher than a liquidus temperature thereof, a difference between its temperature and the liquidus temperature being less than or equal to 30° C.

2. The method for manufacturing a joined metal member according to claim 1, wherein the unevenness is formed over the surface of the first metal member and the oxide film is formed over the unevenness of the surface by applying a laser beam to the surface.

3. The method for manufacturing a joined metal member according to claim 2, wherein a distance between a top surface portion and a bottom surface portion height difference of the unevenness is 10 to 1,000 μm.

4. The method for manufacturing a joined metal member according to claim 1, wherein the second metal material is a metal material containing magnesium as its main component.

5. The method for manufacturing a joined metal member according to claim 4, wherein the first metal material is a metal material containing iron or aluminum as its main component.

6. The method for manufacturing a joined metal member according to claim 5, wherein the first metal material is the same metal material as the second metal material.

7. A joined metal member in which a first metal member made of a first metal material and a second metal member made of a second metal material having a melting point lower than or equal to that of the first metal material are joined together by injection-molding, wherein
unevenness is formed over a surface of the first metal member, and an oxide film having a thickness of 0.01 to 10 μm covering the unevenness is formed in the first metal member, the surface of the first metal member serving as a joining surface to which the second metal member is joined,
the second metal member is joined to the first metal member, the second metal member being injection-molded from the second metal material, the second metal material being, when it is injected, in a semi-molten state, or in a molten state having a temperature that is higher than a liquidus temperature thereof, a difference between its temperature and the liquidus temperature being less than or equal to 30° C.,
a joining strength between the first and second metal members is 30 MPa or larger.

8. The joined metal member according to claim 7, wherein the unevenness and the oxide film are formed over the surface of the first metal member by applying a laser beam to the surface.

9. The joined metal member according to claim 7, wherein a distance between a top surface portion and a bottom surface portion of the unevenness is between 10 and 1,000 μm.

10. The joined metal member according to claim 7, wherein the second metal material is a metal material containing magnesium as its main component.

11. The joined metal member according to claim 10, wherein the first metal material is a metal material containing iron or aluminum as its main component.

12. The joined metal member according to claim 10, wherein the first metal material is a metal material containing magnesium as its main component.

* * * * *